US009100539B2

(12) United States Patent  
Sanso

(10) Patent No.: US 9,100,539 B2  
(45) Date of Patent: Aug. 4, 2015

(54) AUGMENTING WEB CONFERENCES VIA TEXT EXTRACTED FROM AUDIO CONTENT

(71) Applicant: Adobe Systems Incorporated, San Jose, CA (US)

(72) Inventor: Antonio Sanso, Allschwil (CH)

(73) Assignee: Adobe Systems Incorporated, San Jose, CA (US)

( * ) Notice: Subject to any disclaimer, the term of this patent is extended or adjusted under 35 U.S.C. 154(b) by 214 days.

(21) Appl. No.: 13/742,449

(22) Filed: Jan. 16, 2013

(65) Prior Publication Data

US 2014/0198174 A1    Jul. 17, 2014

(51) Int. Cl.

| | |
|---|---|
| *H04N 7/14* | (2006.01) |
| *H04N 7/15* | (2006.01) |
| *G06Q 30/02* | (2012.01) |
| *H04L 12/18* | (2006.01) |
| *G10L 15/26* | (2006.01) |
| *G10L 15/22* | (2006.01) |

(52) U.S. Cl.  
CPC ............. *H04N 7/15* (2013.01); *G06Q 30/0269* (2013.01); *H04L 12/1827* (2013.01); *G10L 15/26* (2013.01); *G10L 2015/223* (2013.01)

(58) Field of Classification Search  
None  
See application file for complete search history.

(56) References Cited

U.S. PATENT DOCUMENTS

| 2009/0316863 | A1* | 12/2009 | Fitzsimmons | ............. | 379/88.11 |
| 2012/0221414 | A1* | 8/2012 | Hetherington et al. | .... | 705/14.58 |
| 2014/0247322 | A1* | 9/2014 | Baldwin | ..................... | 348/14.08 |

* cited by examiner

*Primary Examiner* — Maria El-Zoobi  
(74) *Attorney, Agent, or Firm* — Kilpatrick Townsend & Stockton LLP

(57) ABSTRACT

Systems and methods for augmenting web conference sessions with multimedia content based on text extracted from audio content transmitted during the web conference. In one embodiment, a conference application or other application can receive audio content from at least one client participating in a web conference. The web conference can connect multiple clients for live sharing of audio and video. The conference application can also extract at least one text item from the audio content. The conference application can also generate augmented electronic content by combining electronic content received via the web conference with additional electronic content based on the at least one text item. The conference application can also provide the augmented electronic content via the web conference.

21 Claims, 6 Drawing Sheets

AUGMENTING WEB CONFERENCES VIA TEXT EXTRACTED FROM AUDIO CONTENT

TECHNICAL FIELD

This disclosure relates generally to computer-implemented methods and systems and more particularly relates to augmenting web conference sessions with multimedia content.

BACKGROUND

Online services such as web conference applications can allow clients at remote locations to share electronic content, such as multimedia content. Web conferences can be used to conduct meetings and training events and/or present lectures or short presentations from any computer accessing a web conference. Web conference applications allow for online collaboration via webinars, interactive conferences, online workshops, etc. Web conferences may also involve the exchange of data between various participants. Participants may communicate via text message, video chat, audio chat, etc.

SUMMARY

One embodiment involves receiving audio content from at least one client participating in a web conference. The web conference connects multiple clients for live sharing of audio and video. The embodiment further involves extracting at least one text item from the audio content. The embodiment further involves generating augmented electronic content by combining electronic content received via the web conference with additional electronic content based on the at least one text item. The embodiment further involves providing the augmented electronic content via the web conference.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
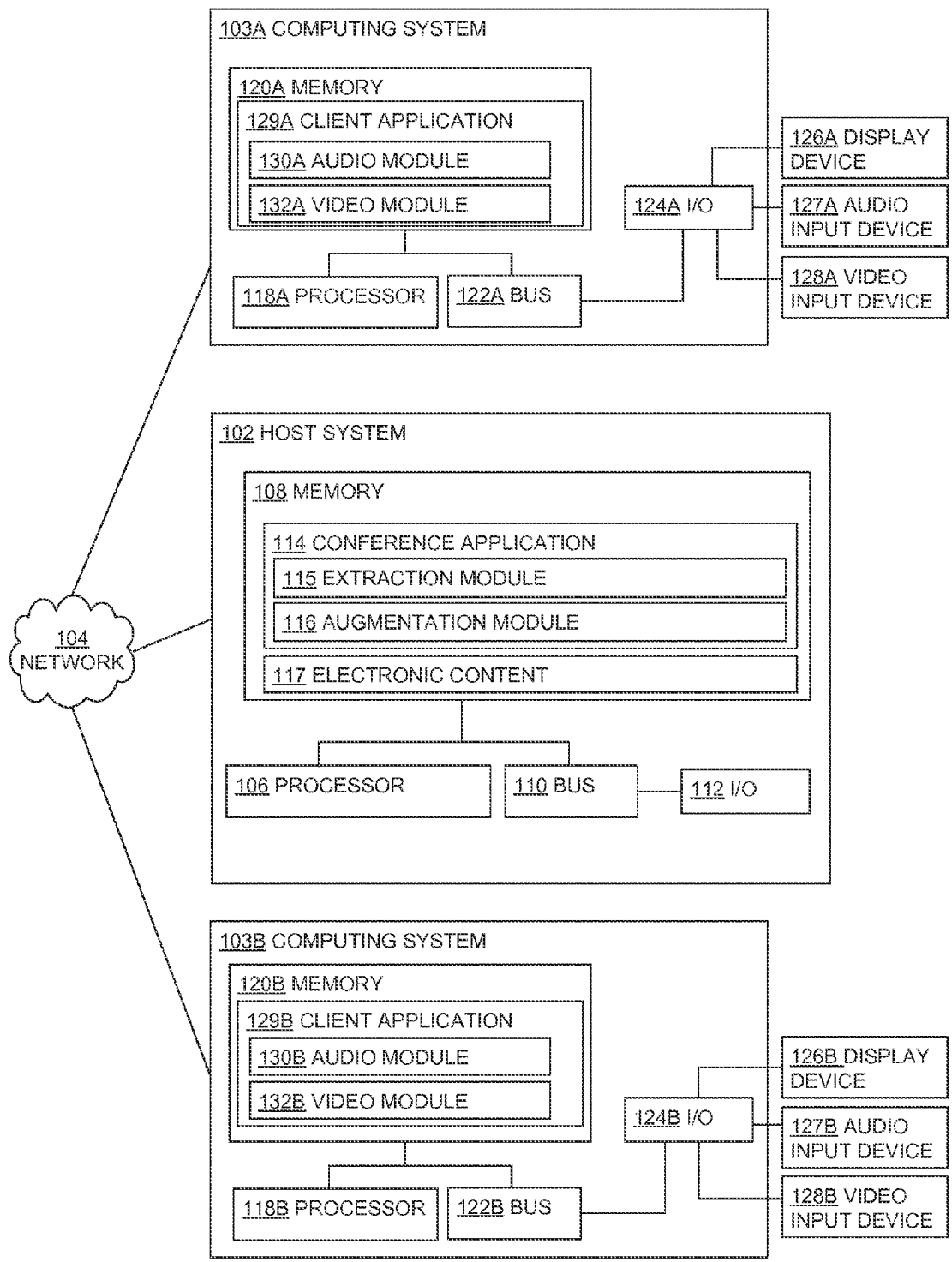
FIG. 1 is a block diagram depicting example computing systems for implementing certain embodiments.

Computer-implemented systems and methods are disclosed for augmenting a web conference with multimedia content based on text or other content extracted from audio content transmitted during the web conference. For example, a web conference application (such as Adobe® Connect™ or another suitable application) can be used to host a web conference. A web conference can be an online session in which multiple clients at remote locations can share multimedia content and other electronic content in real time. The web conference can communicatively connect multiple clients for live sharing of audio and video. Audio data can be received during the web conference. An example of such audio data is digital audio captured at different client devices when participants in the web conference speak to one another. A filter or other software module can be executed by the web conference application to filter the audio in real time. One or more keywords can be extracted from the filtered audio data. The keywords can be used to retrieve advertisements or other multimedia content. Video and/or images transmitted during the web conference can be combined with the advertisements or other multimedia content to generate augmented content. A non-limiting example of augmented video content can include video transmitted by a participant in the web conference that is combined with a banner advertisement selected by the conference application based on audio data transmitted by the participant. The web conference application provides the augmented video to one or more participants in the web conference.

In accordance with one embodiment, a conference application or other application augments a web conference based on text or other content extracted from audio data during the web conference. The conference application can receive audio content from at least one client participating in a web conference, such as (but not limited to) digital audio data representing words spoken by one of the participants of the web conference. The conference application can extract at least one text item from the audio content. For example, the conference application can apply a software filter to the audio content and execute a speech recognition algorithm to identify one or more words in the audio content. The conference application can generate augmented electronic content by combining electronic content received via the web conference with additional electronic content based on the text item extracted from the audio content. For example, the words or another sound pattern identified by the software filter may be compared to stored multimedia content, such as (but not limited to) advertising content for one or more advertising campaigns stored in a database accessible by the conference application. The conference application may determine that one or more words extracted from the audio content match or otherwise correspond to keywords included in metadata for advertising content. The conference application may combine video content received from a participant in the conference with the advertising content corresponding to keywords extracted from the audio content. The conference application can provide the augmented electronic content via the web conference. In one non-limiting example, a conference application can provide augmented electronic content to a recipient computing device associated with a specific client or group of clients, such as clients associated with a targeted demographic for an advertisement or a client from which the audio data originated. In another non-limiting example, a conference application can provide augmented electronic content to multiple participants in the web conference.

As used herein, the term "conference application" is used to refer to a service or other application that can host a session for sharing electronic content in real time via a data network among multiple clients at remote locations. Non-limiting examples of a web conference include webinars, online workshops, online meetings, and the like. In some embodiments, a conference application allows multicast communications from one sender client to many receiver clients. In other embodiments, a conference application allows real-time point-to-point communications. A conference application can include one or more additional features such as (but not limited to) text-based chat features, voice and video chat features, sharing of desktops, etc.

As used herein, the term "electronic content" is used to refer to any type of media that can be rendered for display or use at a computing system or other electronic device. Electronic content can include text or multimedia files, such as images, video, audio, or any combination thereof.

As used herein, the term "client" is used to refer to a logical entity used in accessing a server and can refer to an account, device, or software application associated with one or more particular persons. As examples, a client may be an entity, such as an account used by an application to access an online service or other application. Similarly, as another example, a client may be a device executing an application to access the online service or other application. An account for a client can also include one or more authentication credentials, such as a password, personal identification number, a security question and an associated answer, etc. In some embodiments, a single client corresponding to a single client account can be associated with a single computing device. In other embodiments, multiple clients corresponding to multiple respective accounts can be associated with a single computing device. In other embodiments, a single client corresponding to a single client account can be associated with multiple computing devices.

As used herein, the term "metadata" is used to refer to information associated with (and generally but not necessarily stored with) an electronic content item that describes a feature of the electronic content item. Metadata may describe a location or identification of electronic content. Non-limiting examples of metadata for an electronic content item can include a title, author, keywords, and the like. Metadata may also describe a relationship between a first electronic content item and a second electronic content item, such as how the first and second electronic content items can be combined and sequenced for a multimedia presentation. Metadata can also describe when and how an electronic content item was created, a file type and other technical information for the electronic content item, and/or access rights for the electronic content item. In some embodiments, metadata includes data included in the electronic content item that is not displayed by a client application using the electronic content item.

In some embodiments, the conference application can determine that keywords extracted from audio content match or otherwise correspond to multiple advertising campaigns. An advertising campaign can include one or more advertising content items that share common ideas, themes, and messages, etc. The conference application can perform one or more operations to select a given advertising campaign or select an order in which the multiple advertising campaigns will be displayed during the web conference. For example, the conference application can identify a weight for each advertising campaign. The weight of each advertising campaign can correspond to an amount of revenue provided by the advertisement provider. The conference application can select advertising campaigns with greater weights to augment the web conference or select the order in which the multiple advertising campaigns will be displayed during the web conference based on the relative weights of the various advertising campaigns.

The conference application can use the text content extracted from real-time audio content to augment a web conference in any suitable manner. In some embodiments, the conference application can identify or otherwise select a voice command based on the text extracted from the real-time audio content. The conference application can augment the web conference by retrieving electronic content for sharing via the web conference and/or by modifying electronic content shared via the web conference. For example, the conference application can access a given file in response to a voice command or navigate within a multimedia presentation in response to a voice command.

In additional or alternative embodiments, the conference application can apply one or more analytics to the text content extracted from real-time audio content to provide feedback to the participant that provided the audio content. For example, a participant in a web conference may be a presenter in an online meeting. The conference application can generate a transcription of a spoken presentation in real time as the presenter speaks. The conference application can perform analytics on the transcription to generate additional data describing one or more qualitative criteria of the presentation, such as the frequency of words indicating uncertainty (e.g., "uh" or "um"), the speed at which the presenter is speaking, the use of jargon by the presenter, etc. The conference application can provide the additional data describing the quality of the presentation to the presenter or other clients in real-time during the presentation. Such real-time feedback can allow a presenter to make adjustments in order to improve the quality of the presentation.

In additional or alternative embodiments, the conference application can analyze the text content extracted from real-time audio content to determine the accuracy of the information included in the text content. For example, the conference application can generate a transcript of the audio content in real time. The conference application can compare information in the transcription to reference data accessible by the conference application. The conference application can determine the accuracy of the information included in the transcription based on the reference data. The conference application can generate data describing the accuracy for the information in the transcription. The conference application can provide data describing the accuracy of the information to one or more recipients in the web conference.

Referring now to the drawings, FIG. 1 is a block diagram depicting exemplary computing systems for implementing certain embodiments. The exemplary computing systems include a host system 102 and computing systems 103a, 103b in communication via a network 104.

The host system 102 includes a processor 106. The processor 106 may include a microprocessor, an application-specific integrated circuit ("ASIC"), a state machine, or other suitable processing device. The processor 106 can include any number of computer processing devices, including one. The processor 106 can be communicatively coupled to a computer-readable medium, such as a memory 108. The processor 106 can execute computer-executable program instructions and/or accesses information stored in the memory 108. The memory 108 can store instructions that, when executed by the processor 106, cause the processor to perform operations described herein.

A computer-readable medium may include (but is not limited to) an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The host system 102 may also include a number of external or internal devices, such as input or output devices. For example, the host system 102 is shown with an input/output ("I/O") interface 112. A bus 110 can also be included in the host system 102. The bus 110 can communicatively couple one or more components of the host system 102.

Each of the computing systems 103a, 103b includes respective processors 118a, 118b. Each of the processors 118a, 118b may include a microprocessor, an ASIC, a state machine, or other processor. Each of the processors 118a, 118b can include any of a number of computer processing devices, including one. Such a processor can include or may be in communication with a computer-readable medium. As depicted in FIG. 1, each of the processors 118a, 118b is communicatively coupled to respective memories 120a, 120b. Each of the processors 118a, 118b respectively executes computer-executable program instructions and/or accesses information stored in the memories 120a, 120b. The memories 120a, 120b store instructions that, when executed by the processor, cause the processor to perform one or more operations described herein.

The computing systems 103a, 103b may also comprise a number of external or internal devices such as a mouse, a CD-ROM, DVD, a keyboard, a display, audio speakers, one or more microphones, or any other input or output devices. For example, each of the computing systems 103a, 103b is respectively shown with I/O interfaces 124a, 124b, display devices 126a, 126b, audio input devices 127a, 127b, and video input devices 128a, 128b. A non-limiting example of a display device is a computer monitor or computer screen. A non-limiting example of an audio input device is a microphone. A non-limiting example of a video input device is a camera. Although FIG. 1 depicts the display devices 126a, 126b, audio input devices 127a, 127b, and video input devices 128a, 128b as separate devices coupled to the computing systems 103a, 103b, some or all of the display devices 126a, 126b, audio input devices 127a, 127b, and video input devices 128a, 128b can be respectively integrated into the computing systems 103a, 103b.

Buses 122a, 122b can be respectively included in the computing systems 103a, 103b. Each of the buses 122a, 122b can communicatively couple one or more components of the computing systems 103a, 103b.

FIG. 1 also illustrates the conference application 114 comprised in the memory 108 of the host system 102 and the client applications 129a, 129b respectively comprised in the memories 120a, 120b of the computing systems 103a, 103b. The conference application 114 stored in the memory 108 can configure the processor 106 to manage and provide a web conference session between the client application 129a executed at the computing system 103a and the client application 129b executed at the computing system 103b. A non-limiting example of a conference application 114 is Adobe® Connect™ server software.

The client applications 129a, 129b can access the conference application 114 to establish a web conference or other communication session. A communication session for communicating via the conference application 114 can be established by the client applications 129a, 129b via the network 104 between computing systems 103a, 103b and the host system 102. Each of the client applications 129a, 129b can include one or more software modules, such as the audio modules 130a, 130b and the video modules 132a, 132b. The audio modules 130a, 130b can respectively configure the processors 118a, 118b to communicate audio data to the conference application 114 and to process audio data received via the conference application 114 for playback at the computing systems 103a, 103b. Audio data can be generated based on sounds captured by the audio input devices 127a, 127b. Audio data can also be generated by applications executed at the computing devices 103a, 103b. The video modules 132a, 132b can respectively configure the processors 118a, 118b to communicate video data to the conference application 114 and to process video data received via the conference application 114 for playback at the computing systems 103a, 103b via the display devices 126a, 126b. Video data can be generated based on images captured by the video input devices 128a, 128b. Video data can also be generated by applications executed at the computing devices 103a, 103b, such as the sharing of desktops via the conference application 114.

In some embodiments, the client applications 129a, 129b can be stand-alone applications. In other embodiments, the client applications 129a, 129b can be embedded in another application, such as an internet browser application. A non-limiting example of a client application is Adobe® Connect™ client software.

The host system 102 can include any suitable computing system for hosting the conference application 114. In one embodiment, the host system 102 may be a single computing system, such as a server system. In another embodiment, the host system 102 may be a virtual server implemented using a number of computing systems connected in a grid or cloud computing topology.

The computing systems 103a, 103b can include any suitable computing device or system for communicating via a network 104 and executing the client applications 129a, 129b. Non-limiting examples of a suitable computing device or system include a desktop computer, a tablet computer, a smart phone, or any other computing device or system suitable for using electronic content.

The host system 102 can provide access to electronic content 117. The electronic content 117 may be resident in any suitable computer-readable medium and execute on any suitable processor. In one embodiment, the electronic content 117 can reside in the memory 108 at the host system 102. In another embodiment, the electronic content 117 can be accessed by the host system 102 from a remote resource, such as another computing system, via the network 104 and provided to the computing systems 103a, 103b.

The conference application 114 can include one or more modules for modifying, providing, or otherwise using the electronic content 117 in a web conference between the client applications 129a, 129b. The conference application 114 can include an extraction module 115 and an augmentation module 116. Although the extraction module 115 and the augmentation module 116 are depicted in FIG. 1 and described herein as separate logical modules of a conference application 114 for ease of reference, other implementations are possible. In some embodiments, the conference application 114, extraction module 115, and/or the augmentation module 116 can be separate applications that can be separately executed by the processor 106. In other embodiments, the conference application 114, extraction module 115, and/or the augmentation module 116 can be a combined logical module executed by the processor 106.

The extraction module 115 can include software, such as (but not limited to) an audio filter, for extracting keywords or other textual content from audio content provided by the audio modules 130a, 130b and/or video content provided by the video modules 132a, 132b. The augmentation module 116 can include software for selecting at least some of the electronic content 117 based on the content extracted by the extraction module 115 and combining the selected electronic content 117 with other content communicated between the client applications 129a, 129b via a web session.

Example processes for extracting content and selecting content are described in detail below with respect to FIGS. 2-5.

Figure 2:
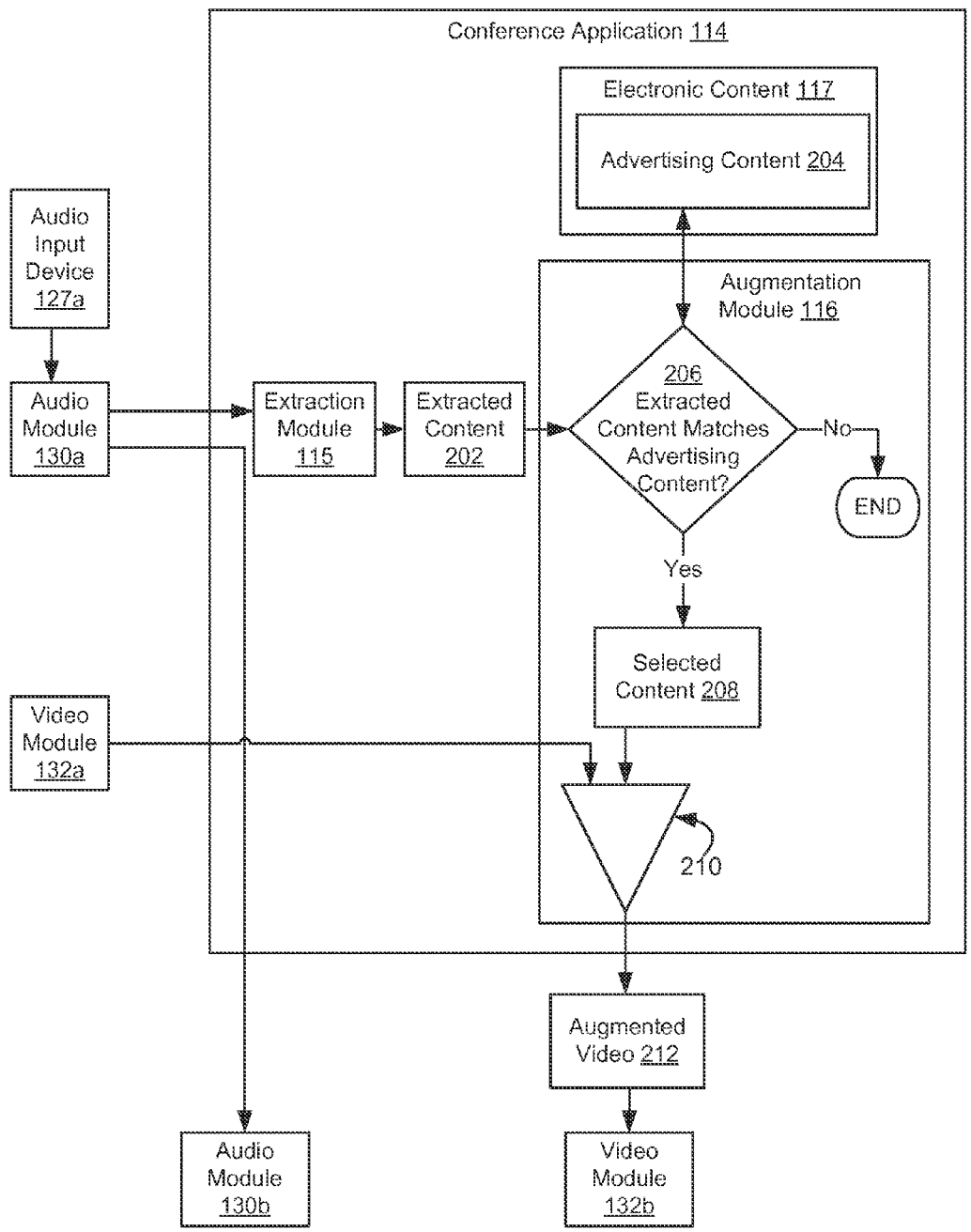
FIG. 2 is a modeling diagram illustrating an example flow of communications for augmenting a web conference with advertising content based on content extracted from audio data.

FIG. 2 is a modeling diagram illustrating an example flow of communications for augmenting a web conference with advertising content 204 based on content 202 extracted from audio data.

The audio module 130a can generate audio data from sounds captured at the computing system 103a via the audio input device 127a. For example, the audio data generated by the audio module 130a can include digital audio data representing speech spoken by a participant in a web conference and captured by the audio input device 127a.

The audio module 130a can provide the audio data both to the audio module 130b via the conference application and to the extraction module 115. The audio module 130b can process the audio data for playback at the computing system 103b. The extraction module 115 can execute one or more filtering and/or speech recognition operations to extract the extracted content 202 from the audio data provided by the audio module 130a. A non-limiting example of extracted content 202 is textual content that includes at least a partial transcription of words included in the spoken audio data. A non-limiting example of an extraction module 115 is the Java Speech Application Programming Interface ("JSAPI").

Non-limiting examples of speech recognition operations can include grammar design, signal processing, phoneme recognition, word recognition, and/or result generation. Grammar design can include defining or otherwise accessing words that may be spoken and one or more patterns in which the words may be spoken. Signal processing can include analyzing the spectrum (i.e., the frequency) characteristics of the audio data provided by the audio module 130a. Phoneme recognition can include comparing spectrum patterns to patterns of phonemes of the language in which the audio is spoken. Word recognition can include comparing a sequence of likely phonemes against the words and patterns of words specified by the active grammars for the language in which the audio is spoken. Result generation can include providing the conference application 114 with information about the words that has been detected in the audio data provided by the extraction module 115.

The extraction module 115 provides the extracted content 202 to the augmentation module 116. The augmentation module 116 can access advertising content 204 or other content included in the electronic content 117. The advertising content 204 can include one or more predefined advertising campaigns. The advertising content 204 can include metadata identifying one or more keywords associated with different campaigns. For example, advertising content for automobiles can include keywords such as "truck," "engine", "car", etc. Advertising content for education software can include keywords such as "school," "learning", "classroom", etc.

The augmentation module 116 determines whether any of the extracted content 202 matches or otherwise corresponds to the advertising content 204, as depicted by the decision block 206. In one non-limiting example, the extracted content 202 may include one or more keywords matching or otherwise corresponding to (either in whole or part) keywords included in metadata for the advertising content 204. In another non-limiting example, the extracted content 202 may include one or more words or phrases matching or otherwise corresponding to (either in whole or part) a brand or product for the advertising content 204.

If at least some of the extracted content 202 matches or otherwise corresponds to the advertising content 204, the augmentation module 116 can augment video data provided by the video module 132a to generate augmented video content 212 to be provided to the video module 132b. For example, as depicted in FIG. 2, the augmentation module 116 can retrieve the selected content 208 that matches or otherwise corresponds to the extracted content 202. The selected content 208 can be, for example, an advertising campaign having keywords matching or otherwise corresponding to the extracted content 202. A combiner module 210 of the augmentation module 116 can combine the selected content 208 with the video data provided by the video module 132a to generate the augmented video content 212. The conference application 114 provides the augmented video content 212 to the video module 132b for playback at the computing system 103b. For example, augmented video content 212 can include selected content 208 displayed as a banner advertisement along with video data provided by the video module 132a. In additional or alternative embodiments, the augmented video content 212 can also be provided to the video module 132a for playback at the computing system 103a.

In additional or alternative embodiments, the augmentation module 114 can identify one or more clients to receive the augmented video 406 based on targeting criteria associated with the clients. Non-limiting examples of targeting criteria include demographics (e.g., age, gender, etc.), income level, geography, and the like. The augmentation module 114 can access client data associated with a client account for each client participating in the web conference. The augmentation module 114 can compare the client data to targeting criteria for advertising content 204. The augmentation module 114 can identify clients having client data with values within the targeting criteria as recipients for the augmented video content 212. The conference application can provide the augmented video content 212 to the identified clients and provide non-augmented video content to other clients.

If none of the extracted content 202 matches or otherwise corresponds to the advertising content 204, the augmentation module 116 does not augment the video data provided by the video module 132a. The video data provided by the video module 132a is provided to the video module 132b via the conference application 114 without any of the advertising content 204 or other electronic content 117 being added.

In some embodiments, the augmentation module 116 can determine that keywords extracted from the audio content match or otherwise correspond to multiple advertising campaigns. The augmentation module 116 can perform one or more operations to select a given advertising campaign or select an order in which the multiple advertising campaigns will be displayed during the web conference. For example, the augmentation module 116 can identify a weight for each advertising campaign. The weight of each advertising campaign can correspond to an amount of revenue provided by the advertisement provider. The augmentation module 116 can select advertising campaigns with greater weights to augment the web conference or select the order in which the multiple advertising campaigns will be displayed during the web conference based on the relative weights of the various advertising campaigns.

Figure 3:
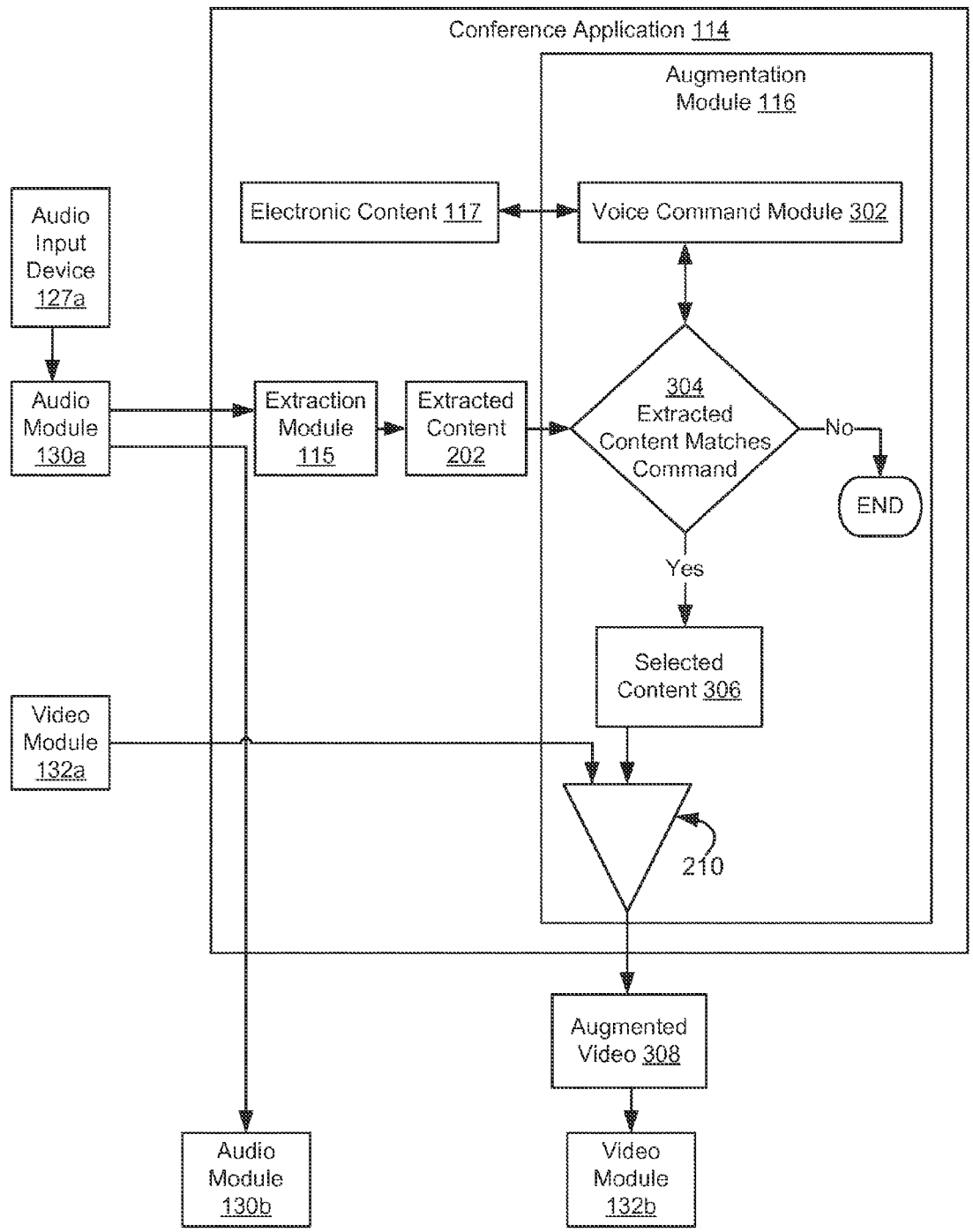
FIG. 3 is a modeling diagram illustrating an example flow of communications for augmenting a web conference via voice commands based on content extracted from audio data.

In additional or alternative embodiments, audio data received from the audio module 130a can trigger one or more voice commands during a web conference. FIG. 3 is a modeling diagram illustrating an example flow of communications for augmenting a web conference via voice commands based on content 202 extracted from audio data.

As described above with respect to FIG. 2, the audio module 130a can generate audio data from sounds captured at the computing system 103a via the audio input device 127a and provide the audio data to the extraction module 115. The extraction module 115 can execute one or more filtering and/or speech recognition operations to extract the content 202 from the audio data.

The extraction module 115 provides the extracted content 202 to the augmentation module 116. As depicted in FIG. 3, the augmentation module 116 can include or otherwise communicate with a voice command module 302. The voice command module 302 can compare the extracted content 202 with one or more pre-defined voice commands. Non-limiting examples of voice commands include commands accessing the electronic content 117, modifying the electronic content 117 (such as by navigating within a presentation shared via the conference application 114), and the like. For example, a speaker may instruct the conference application 114 to retrieve a certain file from the electronic content 117 by speaking the phrase "retrieve file X" or "open file X." The voice command module 302 can identify the phrases "retrieve file" or "open file" as voice commands for providing the specified file. In another example, a speaker may instruct the conference application 114 to advance to a slide in a presentation by speaking the phrase "next slide" or "previous slide." The voice command module 302 can identify the phrases "next slide" or "previous slide" as voice commands for navigating within a presentation shared via the conference application 114.

The augmentation module 116 determines whether any of the extracted content 202 matches or otherwise corresponds to a voice command, as depicted by the decision block 304.

If at least some of the extracted content 202 matches or otherwise corresponds to a voice command, the augmentation module 116 can augment video data provided by the video module 132a to generate augmented video content 212 to be provided to the video module 132b. For example, as depicted in FIG. 3, the augmentation module 116 can retrieve the selected content 306 based on the command matching or otherwise corresponding to the extracted content 202. The selected content 306 can be, for example, a file or other data to be shared during the conference. The combiner module 210 of the augmentation module 116 can combine the selected content 306 with video data provided by the video module 132a to generate the augmented video 308. The conference application 114 provides the augmented video 308 to the video module 132b for playback at the computing system 103b. In additional or alternative embodiments, the augmented video 308 can also be provided to the video module 132a for playback at the computing system 103a.

If none of the extracted content 202 matches or otherwise corresponds to a voice command, the augmentation module 116 does not augment the video data provided by the video module 132a.

Figure 4:
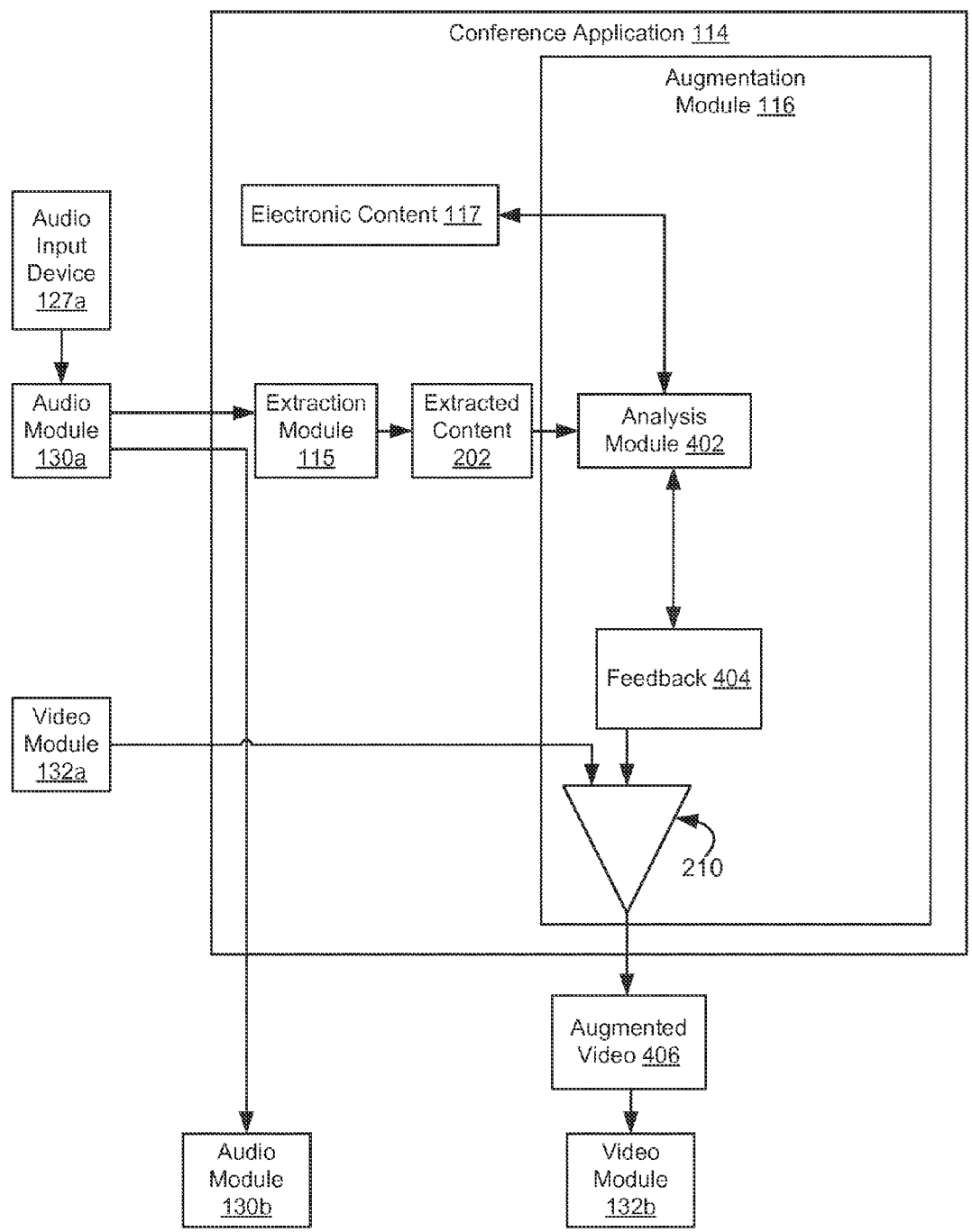
FIG. 4 is a modeling diagram illustrating an example flow of communications for augmenting a web conference via analytics based on content extracted from audio data.

In additional or alternative embodiments, the conference application 114 can augment a web conference by providing feedback to one or more speakers participating in the web conference. FIG. 4 is a modeling diagram illustrating an example flow of communications for augmenting a web conference via analytics based on content extracted from audio data.

For example, the conference application 114 may be used to host an online seminar. The conference application 114 can analyze the content of an answer provided by a participant in response to a question to determine the accuracy of the answer or the speaking style of a participant. The conference application 114 can provide data describing the accuracy of the information or qualitative feedback on a speaker's presentation style.

As described above with respect to FIG. 2, the audio module 130a can generate audio data from sounds captured at the computing system 103a via the audio input device 127a and provide the audio data to the extraction module 115. The extraction module 115 can execute one or more filtering and/or speech recognition operations to extract the extracted content 202 from the audio data.

The extraction module 115 provides the extracted content 202 to the augmentation module 116. As depicted in FIG. 4, the augmentation module 116 can include or communicate with an analysis module 402. The analysis module 402 can analyze the extracted content based on any number of criteria, such as criteria included in the electronic content 117.

In some embodiments, the analysis module 402 can perform analytics on text content in the extracted content 202. Such analytics can include description(s) of statistics, patterns, or other characteristics of textual content. The electronic content 117 can include data for evaluating the extracted content 202. The analysis module 402 can generate feedback data 404 based on criteria provided in the electronic content 117. For example, the augmentation application can determine the frequency with which expressions of hesitancy or uncertainty (e.g., the word "uh") are included in the extracted content 202, the degree to which the vocabulary used by the speaker is appropriate to the audience (e.g., the prevalence of technical jargon), the speed at which speaker speaks, etc. The augmentation module 116 of the conference application 114 can thereby allow one or more participants of a web conference to analyze the speaking style of a participant. For example, the analysis module 402 can recommend changes in wording for a speaking style as the feedback data 404 based on text analytics performed on textual content in the extracted content 202.

In additional or alternative embodiments, the analysis module 402 can analyze the extracted content 202 to determine the accuracy of information provided by a speaker, such as a student in a seminar. For example, electronic content 117 can include data describing questions to be asked during a web seminar and data describing expected answers for the questions. The analysis module 402 can analyze extracted content 202 from a first set of audio data to determine that a facilitator of the seminar has asked one of the questions. The analysis module 402 can compare one or more words in the extracted content 202 to questions included in the electronic content 117 to identify the question asked. The analysis module 402 can analyze additional extracted content 202 from a second set of audio data to determine that a participant in the seminar has answered the question. The analysis module 402 can compare the additional extracted content 202 to data included in the electronic content 117 describing the expected answer for the question. The analysis module 402 can generate feedback data 404 based on how closely the information in the provided answer correlates with the answer included in the electronic content 117.

The augmentation module 116 can augment video data provided by the video module 132a with the feedback data 404 to generate augmented video 406 to be provided to the video module 132b. For example, as depicted in FIG. 4, the augmentation module 116 can combine feedback data 404 with video provided by the video module 132a to generate augmented video 406. The conference application 114 provides the augmented video 406 to the video module 132b for playback at the computing system 103b. In additional or alternative embodiments, the augmented video 406 can also be provided to the video module 132a for playback at the computing system 103a.

Figure 5:
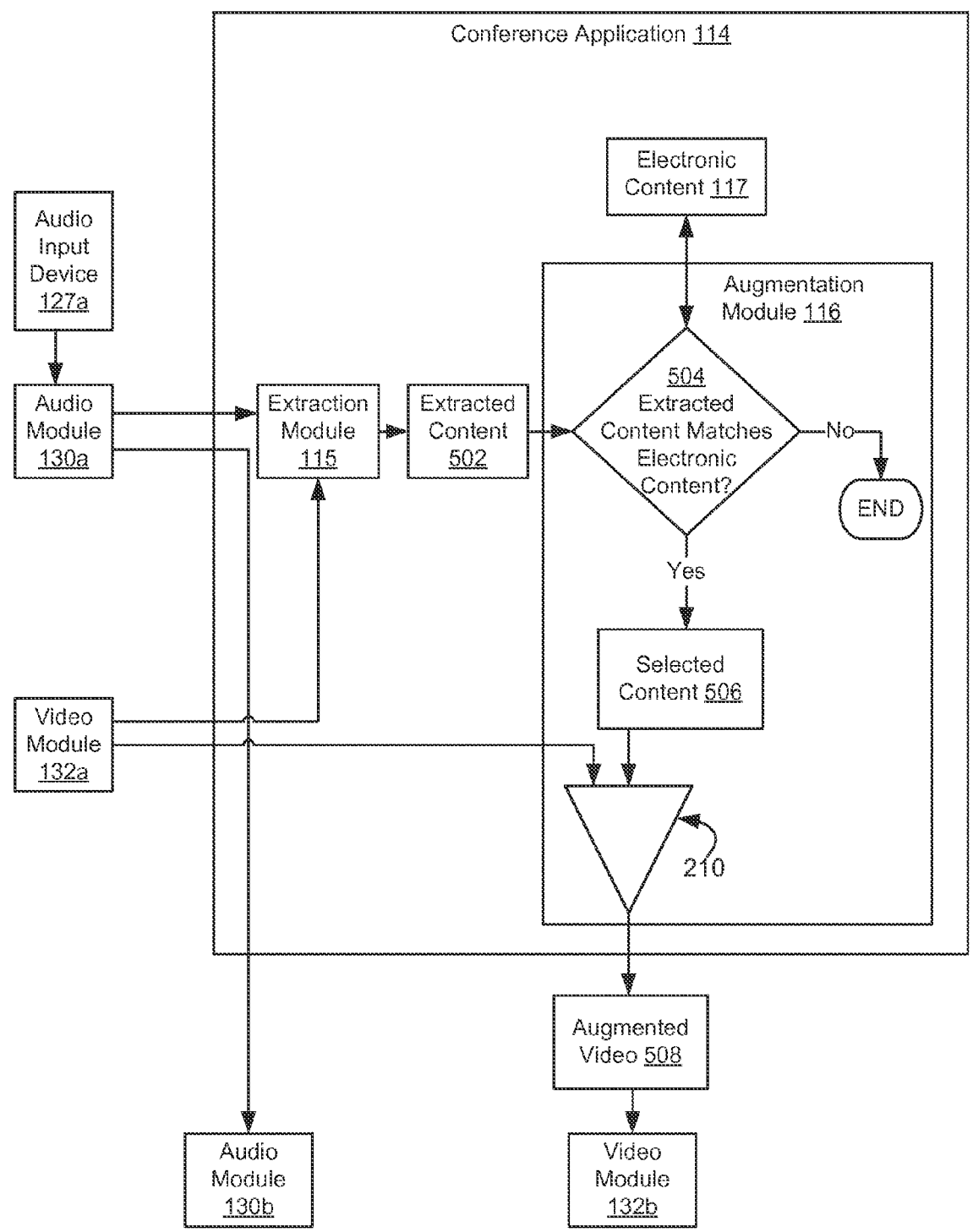
FIG. 5 is a modeling diagram illustrating an example flow of communications for augmenting a web conference based on content extracted from audio and/or video data.

In additional or alternative embodiments, the conference application 114 can augment a web conference in real time based on video transmitted via the web conference. For example, FIG. 5 is a modeling diagram illustrating an example flow of communications for augmenting a web conference based on content extracted from audio and/or video data. As depicted in FIG. 5, the audio module 130a can generate audio data from sounds captured at the computing system 103a via the audio input device 127a and provide the audio data to the extraction module 115. The video module 132a can generate video data from one or more images captured at the computing system 103a via the video input device 128a and/or generated by an application executed at the computing system 103a. The video module 132a can provide the video data to the extraction module 115. The extraction module 115 can execute one or more filtering and/or speech recognition operations to extract textual content as the extracted content 502 from the audio data provided by the audio module 130a. The extraction module 115 can additionally or alternatively perform one or more image capture operations to extract image content as extracted content 202 from the video data provided by the video module 132a. The extraction module 115 provides the extracted content 502 to the augmentation module 116. The augmentation module 116 can determine whether any of the electronic content 117 matches or otherwise corresponds to the extracted content 502, as depicted by the decision block 504. If any of the electronic content 117 matches or otherwise corresponds to the extracted content 502, the augmentation module 116 can select the matching or corresponding content. The augmentation module 116 can combine the selected content 506 with video content provided by the video module 132a to generate augmented video 508. The conference application 114 can provide the augmented video to the video module 132b and/or client application in communication with the conference application (i.e., other participants of the web conference).

Although FIGS. 2-5 depict augmented video being provided from a video module 132a to a single video module 132b via the conference application 114, other implementations are possible. Any number of video modules included in any number of client applications executed by any number of computing systems can receive video via a conference application 114. In additional or alternative embodiments, augmented video can be provided to the computing system that originates the audio data or video from which content is extracted for augmentation purposes.

Figure 6:
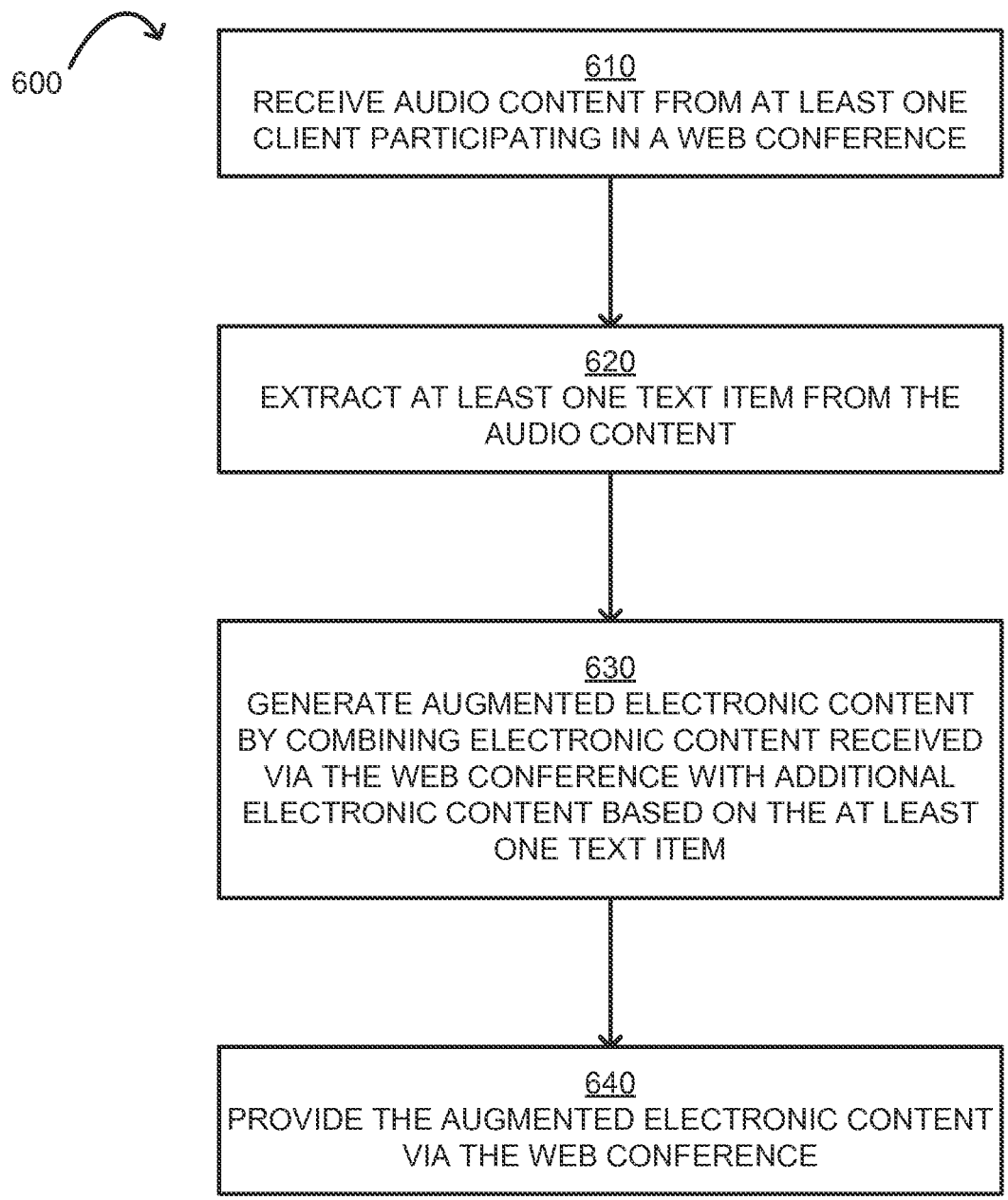
FIG. 6 is a flow chart illustrating an example method for augmenting a web conference with multimedia content based on text extracted from audio content transmitted during the web conference.

FIG. 6 is a flow chart illustrating an example method 600 for augmenting a web conference with multimedia content based on text or other content extracted from audio content transmitted during the web conference. For illustrative purposes, the method 600 is described with reference to the system implementations depicted in FIG. 1 and the flows of communication depicted in FIGS. 2-5. Other implementations, however, are possible.

The method 600 involves receiving audio content from at least one client participating in a web conference, as shown in block 610. The web conference can connect multiple clients for live sharing of audio and video. The processor 106 of the host system 102 can execute the conference application 114 to host the web conference and receive the audio content, as described above with respect to FIGS. 2-5.

The method 600 further involves extracting at least one text item from the audio content, as shown in block 620. The processor 106 of the host system 102 can execute the extraction module 115 of the conference application 114 to extract the text item(s) from the audio content, as described above with respect to FIGS. 2-5.

The method 600 further involves generating augmented electronic content by combining electronic content received via the web conference with additional electronic content based on the at least one text item, as shown in block 630. The processor 106 of the host system 102 can execute the augmentation module 116 of the conference application 114 to generate the augmented electronic content, as described above with respect to FIGS. 2-5.

The method 600 further involves providing the augmented electronic content via the web conference, as shown in block 640. The processor 106 of the host system 102 can execute the conference application 114 to provide the augmented electronic content via the web conference, as described above with respect to FIGS. 2-5.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   receiving, by a processing device configured to host a web conference, audio content from at least one client participating in the web conference;
   extracting, by the processing device, at least one text item from the audio content, wherein the at least one text item comprises a transcription of the audio content;
   determining an accuracy for information in the transcription based on a comparison to reference data;
   generating additional electronic content describing the accuracy for the information in the transcription;
   generating, by the processing device, augmented electronic content by combining electronic content received via the web conference with the additional electronic content; and
   providing, by the processing device, the augmented electronic content via the web conference.

2. The method of claim 1, wherein the audio content is received in real time during the web conference.

3. The method of claim 1, wherein extracting the at least one text item comprises applying a speech recognition algorithm to the audio content.

4. The method of claim 1, wherein the at least one text item further comprises at least one keyword, the method further comprising generating additional augmented electronic content including the electronic received via the web conference and electronic content corresponding to the at least one keyword.

5. The method of claim 1, wherein the at least one text item further comprises at least one command, the method further comprising generating additional augmented electronic content including the electronic received via the web conference and electronic content retrieved in response to the at least one command.

6. The method of claim 1, further comprising analyzing the transcription to generate additional data describing one or more qualitative criteria of the audio content, wherein the additional electronic content comprises the additional data describing the quality of the audio content.

7. The method of claim 1, further comprising:
   receiving, by the processing device, video content from the at least one client; and
   extracting, by the processing device, at least one image from the video content;
   wherein the augmented electronic content is generated by combining the electronic content received via the web conference with the additional electronic content based on the at least one text item extracted from the audio content and the at least one image extracted from the video content.

8. The method of claim 1, wherein the additional electronic content comprises video content.

9. The method of claim 1, wherein the additional electronic content comprises audio content.

10. The method of claim 1, wherein the additional electronic content comprises text content.

11. A non-transitory computer-readable medium embodying program code executable by a processing device, the non-transitory computer-readable medium comprising:
    program code for receiving audio content from at least one client participating in a web conference, the web conference connecting multiple clients for live sharing of audio and video;
    program code for extracting at least one text item from the audio content, wherein the at least one text item comprises a transcription of the audio content;
    program code for determining an accuracy for information in the transcription based on a comparison to reference data;
    program code for generating additional electronic content describing the accuracy for the information in the transcription;
    program code for generating augmented electronic content by combining electronic content received via the web conference with the additional electronic content; and
    program code for providing the augmented electronic content via the web conference.

12. The non-transitory computer-readable medium of claim 11, further comprising program code for receiving the audio content in real time during the web conference.

13. The non-transitory computer-readable medium of claim 11, wherein the program code for extracting the at least one text item comprises program code for applying a speech recognition algorithm to the audio content.

14. The non-transitory computer-readable medium of claim 11, wherein the at least one text item further comprises at least one keyword, the non-transitory computer-readable medium further comprising program code for generating additional augmented electronic content including the electronic received via the web conference and electronic content corresponding to the at least one keyword.

15. The non-transitory computer-readable medium of claim 11, wherein the at least one text item further comprises at least one command, the non-transitory computer-readable medium further comprising program code for generating additional augmented electronic content including the electronic received via the web conference and electronic content retrieved in response to the at least one command.

16. The non-transitory computer-readable medium of claim 11, further comprising program code for analyzing the transcription to generate additional data describing one or more qualitative criteria of the audio content, wherein the additional electronic content comprises the additional data describing the quality of the audio content.

17. The non-transitory computer-readable medium of claim 11, further comprising:
    program code for receiving video content from the at least one client; and
    program code for extracting at least one image from the video content;

wherein the augmented electronic content is generated by combining the electronic content received via the web conference with the additional electronic content based on the at least one text item extracted from the audio content and the at least one image extracted from the video content.

18. A system comprising:
a processor configured to execute instructions stored in a non-transitory computer-readable medium providing a conference application;
wherein the conference application comprises one or more modules configured to perform operations comprising:
  receiving audio content from at least one client participating in a web conference, the web conference connecting multiple clients for live sharing of audio and video;
  extracting at least one text item from the audio content, wherein the at least one text item comprises a transcription of the audio content;
  determining an accuracy for information in the transcription based on a comparison to reference data;
  generating additional electronic content describing the accuracy for the information in the transcription;
  generating augmented electronic content by combining electronic content received via the web conference with the additional electronic content; and
  providing the augmented electronic content via the web conference.

19. The system of claim 18, wherein the audio content is received in real time during the web conference.

20. The system of claim 18, wherein extracting the at least one text item comprises applying a speech recognition algorithm to the audio content.

21. The system of claim 18, wherein the at least one text item further comprises at least one keyword, the operations further comprising generating additional augmented electronic content including the electronic received via the web conference and electronic content corresponding to the at least one keyword.

* * * * *